April 6, 1948. D. H. CUNNINGHAM ET AL 2,438,964
MAGNETIC FIELD DETECTOR
Filed Nov. 2, 1942
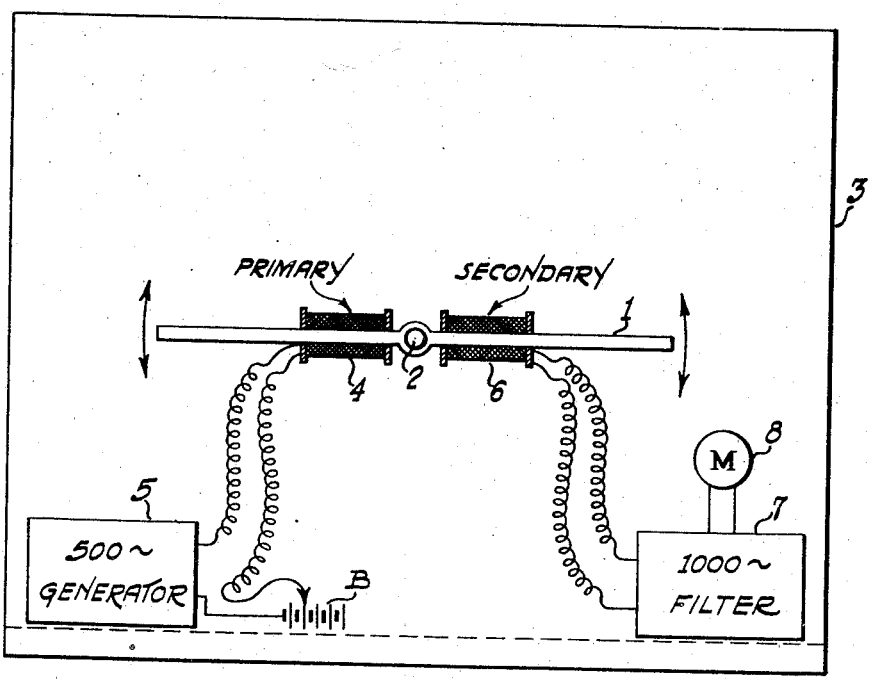
Fig.1.
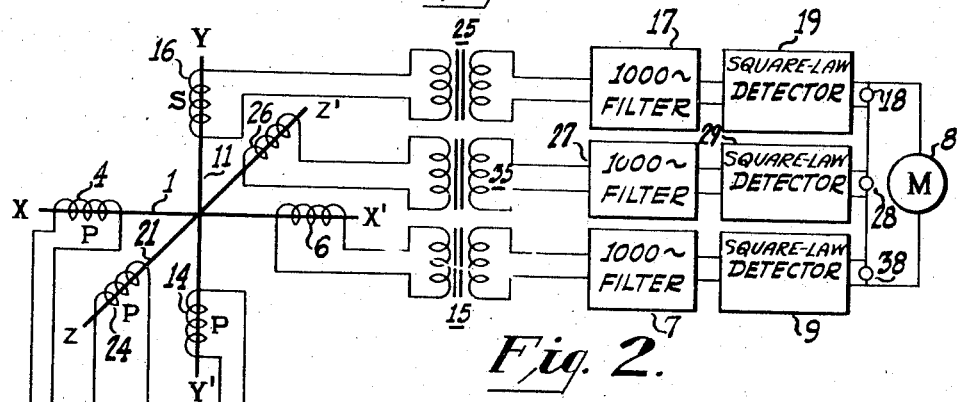
Fig. 2.
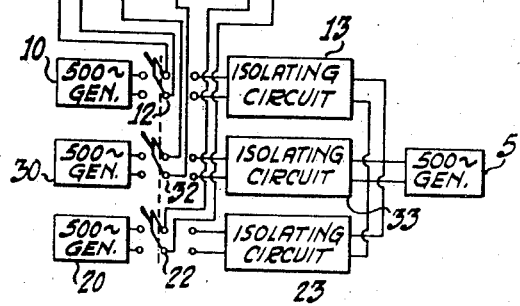
Inventors
DAVID H. CUNNINGHAM
and HERBERT BELAR
By
Attorney Patented Apr. 6, 1948

2,438,964

UNITED STATES PATENT OFFICE 2,438,964

MAGNETIC FIELD DETECTOR

David H. Cunningham, Haddonfield, and Herbert Belar, Palmyra, N. J., assignors to Radio Corporation of America, a corporation of Delaware Application November 2, 1942, Serial No. 464,296

1 Claim. (Cl. 175—183)

This invention relates generally to magnetic field detectors and particularly to a new and improved method of and means for detecting the presence of, or variations in, a magnetic field by measuring the distortion caused by this field in an electromagnetic circuit.

It has been found that in currents which flow through a magnetic circuit which includes a magnetic core, such as in a transformer, relatively high even numbered harmonics can be generated if the core is subjected to a magnetic field. If the core is relatively long and thin and is of high permeability material, weak magnetic fields, or changes therein, can be detected and measured. This effect may be utilized for measuring or indicating variations in the earth's magnetic field. It may also be employed for indicating the direction and magnitude of the earth's magnetic field, or any other magnetic field.

Briefly, the apparatus required comprises a relatively long, thin core of high permeability magnetic material such as "Mu-metal." The core is surrounded by one or more windings. A source of alternating current having a frequency, for example, of five hundred cycles per second, which is preferably free of second harmonics, is connected to one of the windings surrounding the core. A second winding is provided on the core and connected through, for example, a thousand cycle filter network to a suitable indicator for measuring the second harmonic component.

The 1000 cycle filter network is connected with its input to another winding and its output to a suitable indicator, for measuring the 1000 cycle component. A single winding may be used in place of a transformer and the second harmonic current may be derived by any other known manner. If the core with its coil is so mounted that it can be rotated with respect to the magnetic field, then it will be found that if the core is athwart or at right angles to the vector of the field, that no second harmonic will be detected other than which may be due to the generator itself. As the device is turned from its null position, the amount of second harmonic output will increase, and a maximum indication will be obtained when the core is parallel to the vector of the field. Variations in the magnetic field will provide relatively large variations in second harmonic output up to a point when the core begins to saturate. From then on, further increases in the field will produce only small changes in the indicated second harmonic output.

By proper proportioning of the core and proper choice of the material thereof, a maximum sensitivity for any given field strength can be obtained. It is also possible to increase the sensitivity of the device to small changes in field strength by designing the core for measuring fields of the magnitude of the change and bringing the total field to be measured within that range by passing a current through a coil or otherwise producing a "bucking" field of the proper amount. It should also be understood that vacuum tube amplifiers may be used to amplify the effect produced to any desired magnitude before filtering, or before or after detection. Also that amplifiers and filter functions may be combined in a selective amplifier.

Among the objects of the invention are to provide an improved method of and means for measuring the intensity of a magnetic field. Another object is to provide a new and improved method of and means for measuring variations in the strength of a magnetic field. Another object is to provide a new and improved method of and means for indicating the direction of a magnetic field. A further object is to provide a new and improved method of and means for measuring the characteristics of a magnetic field which includes energizing a core of high permeability material by currents from a source of low frequency alternating potential, and measuring the even harmonic component generated in the magnetic circuit by the magnetic field. A still further object of the invention is to provide a plurality of such magnetic devices disposed in angular relation to each other, and means for measuring the even harmonic currents generated by the individual units to derive the direction and intensity of a magnetic field. A further object of the invention is to provide means for orienting a single magnetic unit in a unidirectional field for determining the direction of said field. A further object of the invention is to provide means for measuring the intensity of the magnetic field, irrespective of the direction, by measuring the sum of the square of three mutually normal vectors of the field.

The invention will be described by reference to the accompanying drawing, of which Figure 1 is an elevational view of one embodiment thereof, and Figure 2 is a schematic diagram of a second embodiment. Similar reference numerals are applied to similar elements throughout the drawing.

Referring to Figure 1, a core of high permeability magnetic material 1 is pivoted at its center 2, and supported in a substantially horizontal position by a vertical supporting member 3. A primary winding 4 surrounds one arm of the magnetic core 1. The primary winding 4 is connected to a source of alternating potential such as, for example, a five hundred cycle generator 5 of conventional design. A source of bias potential, such as a battery B, may be connected between the winding 4 and the A.-C. source 5, for the purpose of producing a "bucking" field to oppose any desired portion of the external field. Such an arrangement provides increased sensitivity for the measurement of minute field strength variations. A secondary winding 6 surrounds the remaining arm of the pivoted core 1. The secondary winding 6 is connected to the input of a one thousand cycle filter network 7 of conventional design, which rejects substantially all frequencies except the second harmonic of the five hundred cycle generator 5. The output of the filter network 7 is connected to any suitable indicator 8 for measuring the amplitude of the second harmonic component thus derived. As the position of the magnetic core 1 is varied both vertically and horizontally, the second harmonic indication on the meter 8 will approach a maximum when the axis of the magnetic core coincides with the direction of the unidirectional magnetic field.

Referring to Figure 2, three magnetic cores 1, 11, and 21, which may be of the type described heretofore, each include primary and secondary windings of similar design. The magnetic core 1 includes the primary winding 4 and the secondary winding 6. The second magnetic core 11 is disposed normal to the first magnetic core 1, and includes the primary winding 14, and the secondary winding 16. The third magnetic core 21 is disposed normal to both the first and second magnetic cores 1 and 11, and includes the primary winding 24 and the secondary winding 26. A five hundred cycle generator 5, of a conventional type, through proper isolating or decoupling means 13, 23, and 33, is connected to energize all three of the primary windings, or separate generators 10, 20 and 30 may be used. For the purpose of illustration only, three double pole-double throw switches 12, 22 and 32 are used to change from the single to the separate A.-C. generators. With all of the switches in the left hand position, separate generators are connected to separate primary windings. With all of the switches in the right hand position, a single generator is connected through the separate isolating circuits 13, 23 and 33 to the windings 4, 14 and 24 respectively. The isolating circuits, which may comprise conventional buffer thermionic amplifiers, prevent harmonic reaction between the various windings. The secondary winding 6 on the first magnetic core 1 is connected to the primary of a first coupling transformer 15. The secondary winding 16 on the second core 11 is connected to the primary of a second coupling transformer 25. The secondary winding 26, on the third core 21, is connected to the primary winding of a third coupling transformer 35.

The secondary of the first coupling transformer 15 is connected through a one thousand cycle filter 7 to the input of a detector 9. The secondary of the second coupling transformer 25 is connected through a second one-thousand cycle filter 17 to the input of a second detector 19. The secondary of the third coupling transformer 35 is connected through a third one thousand cycle filter 27 to the input of a third detector 29.

These detectors are so designed that the output therefrom is proportional to the square of the field intensity to be measured. For instance, if a linear relationship existed between second harmonic output and field intensity, then this detector should be a square law detector. Actually over the most sensitive working range, the harmonic output varies as a higher than second power of the field intensity. The conversion of that by means of a detector to a square law function is well known in the art. Most common crystal or thermionic tube detectors have square-law characteristics for low applied signal magnitudes. Such square law detectors are described and explained, for example, in the Radio Engineers' Handbook by F. E. Terman (McGraw-Hill, 1943) at pages 565–566, and in numerous other publications including those enumerated therein. The rectified outputs of the three detectors 9, 19, and 29 are combined additively and applied to the meter 8, which may be of any conventional type having the desired sensitivity. This meter indicates the algebraic sum of the squares of the field intensity along the vectors X, Y and Z. If desired, similar separate meters 18, 28, and 38 may be connected to the output circuits of each of the detectors to indicate separately the output currents or voltages of the individual detectors. The first meter 8 will therefore indicate the square of the intensity of the total unidirectional magnetic field, and can be calibrated to indicate intensity directly as a scalar quantity, while the indications on the other meters 18, 28, and 38 may be utilized to indicate the respective squared values on the three rectilinear coordinates X—X', Y—Y', Z—Z', of the unidirectional magnetic field.

It should be understood that the physical characteristics of the magnetic cores and windings will be determined by the characteristics of the magnetic field under observation and by the sensitivity desired. The sensitivity of either of the modifications described heretofore may be increased to any desired extent by the insertion of amplifiers, not shown, between the one-thousand cycle filters and the detectors. An idea of the sensitivity of the device without amplification may be had from the fact that the earth's unidirectional magnetic field will provide a second harmonic current output of approximately ten percent of the amplitude of the applied five hundred cycle currents. For example, a core of Mu-metal 2¾ inches long, ½ inch wide, and .015" thick, upon which are mounted two windings of 1000 turns of No. 39 wire, will provide approximately .2 volt of second harmonic frequency when a 500 cycle signal of 2 volts is applied, and the core is subjected to the earth's magnetic field.

We claim as our invention:

A magnetic field detector including three similar cores of high permeability magnetic material fixedly disposed normal to each other in said field, a first winding on each of said cores, three separate similar sources of alternating current of substantially sine wave form, means for applying said current to each of said first windings from a different one of said sources, a second winding on each of said cores, a plurality of filter networks for deriving currents of a selected even harmonic of said applied currents, means connecting a separate one of said filter networks to each of said second windings, the amplitude of said selected even harmonic currents being a function of the strength of said field on the axes of each of said cores, three separate square-law detectors, means for applying the output currents from each of said filters to a different one of said detectors, means for indicating separately the output currents of each of said detectors, each of said output currents being proportional respectively to the square of the field intensity on the axis of different ones of said cores, means serially connecting said detectors for combining algebraically said detector output currents, and means for indicating said combined currents in terms of the algebraic sum of the squares of the field intensities on the axes of said cores.

DAVID H. CUNNINGHAM.
HERBERT BELAR.

REFERENCES CITED

The following references are of record in the file of this patent:

UNITED STATES PATENTS

| Number | Name | Date |
|---|---|---|
| 1,546,427 | Affel | July 21, 1925 |
| 2,047,609 | Antranikian | July 14, 1936 |
| 2,053,154 | La Pierre | Sept. 1, 1936 |
| 2,192,242 | Robinson | Mar. 5, 1940 |
| 2,213,357 | Barth | Sept. 3, 1940 |

FOREIGN PATENTS

| Number | Country | Date |
|---|---|---|
| 451,850 | Great Britain | Aug. 10, 1936 |